March 3, 1959  R. L. MITCHELL ET AL  2,875,473
PROCESS OF FORMING SOLID PARTICULATE HYDROXYETHOXYCELLULOSE
Filed Aug. 10, 1955
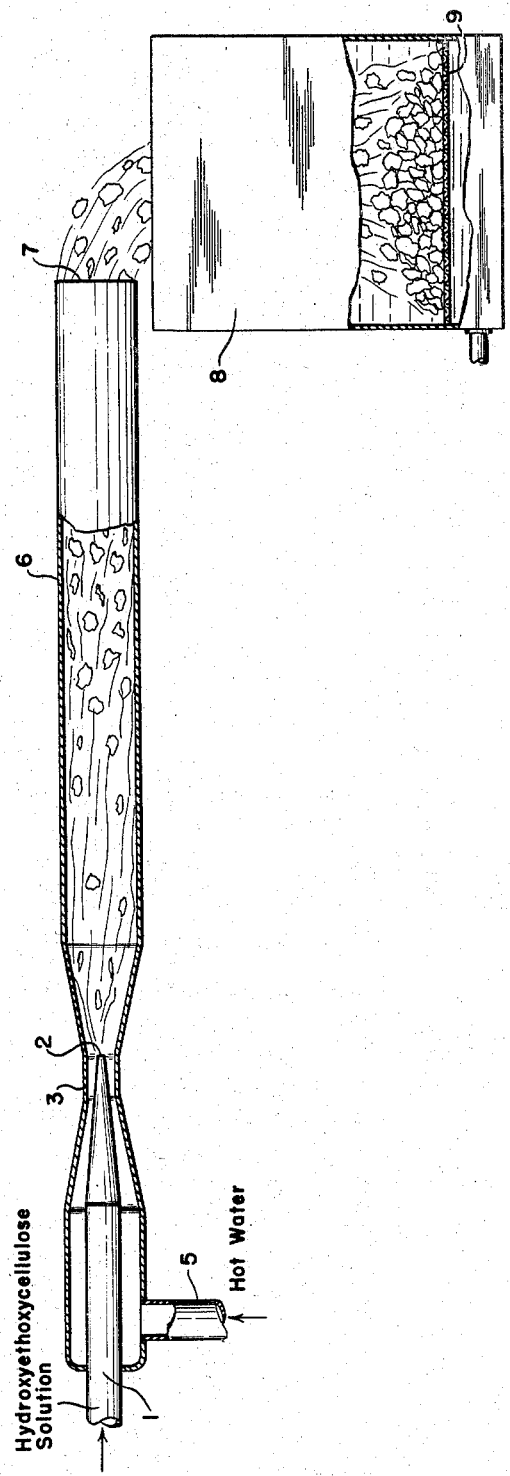
INVENTORS
REID LOGAN MITCHELL
ROBERT FRIEDRICH BAMPTON
WILLIAM HUGHES WADMAN
BY
ATTORNEYS

United States Patent Office 2,875,473
Patented Mar. 3, 1959

2,875,473

PROCESS OF FORMING SOLID PARTICULATE HYDROXYETHOXYCELLULOSE

Reid Logan Mitchell, Robert Friedrich Bampton, and William Hughes Wadman, Shelton, Wash., assignors to Rayonier Incorporated, Shelton, Wash., a corporation of Delaware Application August 10, 1955, Serial No. 527,574

3 Claims. (Cl. 18—47.5)

This invention relates to hydroxyethoxycellulose (more commonly known as hydroxyethylcellulose) and has for its object the production of an improved solid form of this compound having from 2% to 8% of ethylene oxide substitution groups and which is soluble in dilute aqueous alkali, and provides a process of producing the improved hydroxyethylcellulose. This application is a continuation-in-part of our patent application Serial No. 488,438, filed February 15, 1955, and is concerned with the treatment of the hydroxyethylcellulose of said application.

The hydroxyethylcellulose of our said application contains from 2% to 8% of ethylene oxide, most effectively from 3% to 5% of ethylene oxide, and since it is soluble in dilute sodium hydroxide solution and can be approximately 99% water insoluble it is particularly suitable for forming the solid product of this invention. This invention produces an improved solid hydroxyethylcellulose, in particulate form, for example as granules, beads, pellets or flakes, which can readily be redissolved in dilute aqueous sodium hydroxide solution for spinning into filaments, casting into sheets or films, or used for other purposes.

In accordance with the process of this invention an aqueous alkaline solution of hydroxyethylcellulose having from 2% to 8%, most advantageously from 3% to 5%, substituted ethylene oxide is precipitated in a large volume of water, preferably hot water, as a gel which is collected and dried. The alkaline solution of hydroxyethylcellulose is discharged through a nozzle into a stream of hot water of much larger volume in which the hydroxyethylcellulose is precipitated as a gel and carried along in the stream of water to a place of separation. The solution of hydroxyethylcellulose is discharged through the nozzle of a venturi tube and into the restricted area of low pressure where it initially contacts a surrounding stream of hot water and the precipitated hydroxyethylcellulose is thus prevented from contacting the walls of the tube until after it has set to a non-sticky state. This material is separated from the hot water, washed and dried, resulting in shrunken dense flake-like particles.

In carrying out the process of the invention the hydroxyethylcellulose preferably containing from 3% to 5% of substituted ethylene oxide is dissolved in a solution containing, say, from 5% to 8% of sodium hydroxide in water, preferably at normal temperatures.

The accompanying drawing is a side elevation with parts in section illustrating more or less diagrammatically an arrangement of apparatus suitable for practicing the process of the invention.

In carrying out the invention in the apparatus illustrated, a solution containing about 8% of hydroxyethylcellulose having about 4% substituted ethylene oxide dissolved in a 6% sodium hydroxide solution is prepared according to the process of our said patent application. This solution contains about 99% water insoluble hydroxyethylcellulose. This solution at normal temperature either before or after filtration is introduced into the pipe 1 and discharged through the nozzle 2 into the confined throat 3 of the venturi device 4. A much larger stream of hot water at a temperature of from 50° to 100° C. is introduced into the pipe 5 under pressure and its flows through the throat 3 at high velocity and into the enlarged elongated pipe 6 at lower velocity. The solution of hydroxyethylcellulose may be discharged under varying pressure depending on the pressure and velocity of the hot water. The location of the nozzle 2 in the venturi tube causes the stream of hydroxyethylcellulose to flow into the hot water and expand in the pipe without contacting the inner walls of the throat of pipe 6. It is important to prevent this contact as the initially precipitated hydroxyethylcellulose is tacky and would adhere to the pipe surfaces.

The hot water results in precipitation due to a combination of heat gelation and removal of the sodium hydroxide from the hydroxyethylcellulose. As the mixture of dispersed hydroxyethylcellulose and hot water pass through the pipe 6 the hydroxyethylcellulose undergoes progressively increasing gelation and is in a consolidated gelatinous state when it is discharged at 7 into the receptacle 8. This receptacle has a screen 9 at the bottom which may be part of an endless belt or a basket and the hydroxyethylcellulose is separated from the dilute caustic solution. The separated hydroxyethylcellulose may be dried or it may be washed in water and then dried. The last wash water may contain a trace of $SO_2$ to maintain whiteness in the final product. As a result of drying, the particles shrink to about one-quarter or less of their wet size. The dry particles are dense, hard and stable and can be used directly or packaged for shipment in that form.

The solid dried hydroxyethylcellulose is a stable particulate material suitable for many uses. It may be dissolved in an aqueous solution of sodium hydroxide, cooled and filtered if desired, however, filtration is not readily necessary if the solution was filtered before pelleting.

The filtered and clear alkaline solution of hydroxyethylcellulose can be precipitated to form filaments or cast into sheets by use of an acid precipitating bath of the general type used for the coagulation and regeneration of viscose. The bath may comprise from about 4% to about 15% sulfuric acid, from about 13% to about 25% of sodium sulfate, and from about 0% to about 15% of zinc sulfate. A solution containing about 12% sulfuric acid and 18% sodium sulfate is satisfactory. Preferably, the solution of hydroxyethylcellulose is introduced into the acid solution at a temperature around 25° to 65° C. When filaments are coagulated they can be treated in the spin bath in a manner similar to the spinning of viscose solutions.

When films are to be produced, the alkaline solution of hydroxyethylcellulose is cast in any suitable way and this may be done in the way viscose films are cast to form films of the type known as cellophane. The films formed by precipitation according to the invention are clear and strong without any sign of sliminess in the wet state. The solution of hydroxyethylcellulose may be cast over rotating cylinders on which the acid precipitating solution is applied, or it may be cast or printed onto a long endless belt such as an inert plastic or stainless steel belt, and while on the belt immersed in the acid bath and subjected to any washing and after treatment required.

The films produced from the hydroxyethylcellulose are clear and strong and are suitable for general wrapping, packaging, etc. The film has excellent adhesion for all types of nitrocellulose or vinyl base coatings yielding a coated film having very superior moisture-resistant properties as well as sparkling clarity.

The following is an example of one process of our said application for producing hydroxyethylcellulose in caustic solution suitable for pelleting.

Example

A continuous sheet of cellulose is steeped in 20% NaOH solution at 25° C. in an operation in which the solution is forced through the sheet to yield alkali cellulose of 35.0% cellulose and 17.2% NaOH in which each fiber is uniformly alkalized. The sheet of alkali cellulose is led into a chamber in which ethylene oxide gas is forced through the sheet of alkali cellulose in such a manner as to uniformly contact each fiber with ethylene oxide while effecting etherification to a uniform level of about 3%. The uniformly etherified sheet of hydroxyethylcellulose is then dissolved in dilute sodium hydroxide at near 0° C. to yield a solution of 8.0% hydroxyethylcellulose and 7.0% NaOH.

The alkaline solution of hydroxyethylcellulose was precipitated as dense, white, flake-like particles using the venturi-tube apparatus illustrated. It was discharged through the nozzle of the venturi tube into the restricted or low-pressure area where it contacted a stream of hot water at a temperature of approximately 60° C. The hydroxyethylcellulose precipitated as a gel and separated in the hot water in the form of stringy, flake-like particles which were carried along with the stream of hot water. These flakes, when separated from said hot water, washed and dried, shrank to dense, white, flake-like particles of small size, constituting a very convenient form to be used and shipped. These flakes were completely and readily soluble in dilute cold caustic solutions and were at least 99% insoluble in water.

We claim:

1. The process of forming solid particulate hydroxyethylcellulose which comprises directing a stream of an aqueous alkaline solution of hydroxyethylcellulose containing from 2% to 8% of substituted ethylene oxide through a nozzle in the restricted zone of a venturi tube and into a surrounding stream of hot water moving in the same direction in said tube thereby preventing the hydroxyethylcellulose from contacting and sticking to the tube, causing removal of sodium hydroxide from the hydroxyethylcellulose in the water of said restricted zone, precipitating gelatinous hydroxyethylcellulose in an enlarged zone of said tube which separates into particles, and thereafter separating and drying the particles of hydroxyethylcellulose.

2. In the process of claim 1, said stream of hydroxyethylcellulose containing from 3% to 5% of substituted ethylene oxide.

3. In the process of claim 1, said stream of an aqueous alkaline solution of hydroxyethylcellulose containing from 5% to 8% of sodium hydroxide.

References Cited in the file of this patent

UNITED STATES PATENTS

| | | |
|---|---|---|
| 2,060,056 | Ellsworth | Nov. 10, 1936 |
| 2,157,530 | Ellsworth | May 9, 1939 |
| 2,326,326 | Breedis | Aug. 10, 1943 |
| 2,447,756 | Lilienfeld | Aug. 24, 1948 |
| 2,543,928 | O'Neill et al. | Mar. 6, 1951 |
| 2,633,604 | Allen et al. | Apr. 7, 1953 |